(12) United States Patent
Kakura et al.

(10) Patent No.: US 6,539,070 B1
(45) Date of Patent: Mar. 25, 2003

(54) CLOCK SYNCHRONIZING CIRCUIT

(75) Inventors: Yoshikazu Kakura, Tokyo (JP); Tomoki Osawa, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/440,522

(22) Filed: Nov. 15, 1999

(30) Foreign Application Priority Data

Nov. 18, 1998 (JP) ............................................ 10-328657

(51) Int. Cl.[7] ................................................ H04C 7/00
(52) U.S. Cl. ........................ 375/355; 375/371; 327/141; 327/291
(58) Field of Search ................................ 375/345, 355, 375/371, 377, 354; 327/141, 291, 2, 9; 341/155; 370/503

(56) References Cited

U.S. PATENT DOCUMENTS 4,039,748 A * 8/1977 Caron et al. ................ 375/355
4,384,357 A * 5/1983 deBuda et al. .............. 375/327
4,914,677 A * 4/1990 Yamaguchi et al. ......... 375/354

OTHER PUBLICATIONS

Floyd M. Gardner, Interpolation in Digital Modems–Part I, IEEE, Transactions on Communications, vol. 41, No. 3, Mar. 1993.*
Floyd M. Gardner, Interpolation in Digital Modems–Part II, IEEE, Transactions on Communications, vol. 41, No. 6, Jun. 1993.*

* cited by examiner

Primary Examiner—Jean Corrielus
Assistant Examiner—Qutbuddin Ghulamali
(74) Attorney, Agent, or Firm—Dickstein, Shapiro, Morin & Oshinsky, LLP.

(57) ABSTRACT

A clock synchronizing circuit enables initial synchronization of clock in spite of the case of modulation system except for quadrature modulation with simple constitution. A cosine/sine output circuit inputs thereto an integration clock 'ICLK', a sampling signal 'SSAMP', a sign switching signal 'SPM', a cosine component integration signal 'SCCI', and a sine component integration signal, before obtaining a cosine signal 'SCOS' corresponding to a cosine component of initial phase of a symbol clock and a sine signal 'SSIN' corresponding to a sine component thereof. An angular detector inputs thereto the cosine signal 'SCOS' and the sine signal 'SSIN', before obtaining initial phase of the symbol clock 'SCLK'.

6 Claims, 5 Drawing Sheets

CLOCK SYNCHRONIZING CIRCUIT

BACKGROUND OF THE INVENTION

The present invention relates to a clock synchronizing circuit for generating a clock which is synchronized with an input signal.

DESCRIPTION OF THE PRIOR ART

Figure 1:
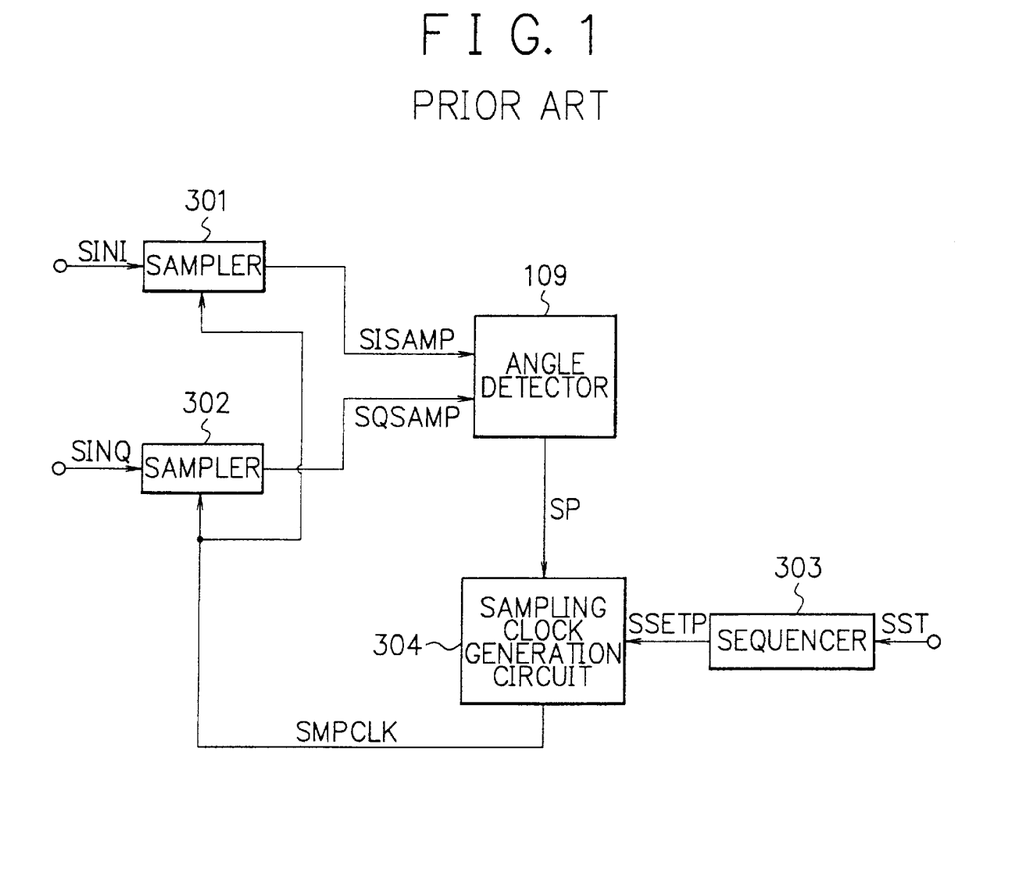
FIG. 1 is a block diagram showing a conventional clock synchronizing circuit.

In a conventional clock synchronizing circuit which deals with a modulation signal yielded according to quadrature modulation, clock phase is obtained by using signal which is sampled in such away that in-phase component and orthogonal component of demodulation base band signal are sampled by a sampler respectively. FIG. 1 shows such the conventional clock synchronizing circuit. In FIG. 1, a sampler 301 implements sampling of in-phase input signal 'SINI' using sampling clock 'SMPCLK', before outputting as in-phase input sampling signal 'SISAMP'. Further, sampler 302 implements sampling of orthogonal input signal 'SINQ' using sampling clock 'SMPCLK', before outputting as orthogonal input sampling signal 'SQSAMP'. Furthermore, angle detector 109 which inputs thereto these in-phase input sampling signal 'SISAMP' and orthogonal input sampling signal 'SQSAMP', to obtain "tan−1" (SQSAMP/SISAMP), before finding phase of symbol clock to output as phase signal 'SP'.

Moreover, a sequencer 303 which inputs thereto a sequence start signal 'SST', before outputting an initial phase establishment signal 'SSETP'. A sampling clock generation circuit 304 which inputs thereto a phase signal 'SP' and an initial phase establishment signal 'SSETP', before outputting a sampling clock 'SMPCLK' undergoing phase control such that the symbol clock is synchronized with both of the in-phase input signal 'SINI' and the orthogonal input signal 'SINQ' with the initial phase establishment signal 'SSETP' as input. According to the operation as above, it is capable of implementing initial phase synchronization of the clock.

However, there is the problem that although such the conventional clock synchronizing circuit is capable of being applied in the case of dealing with modulation signal according to quadrature modulation, such the conventional clock synchronizing circuit is incapable of being applied in the case of use of modulation system of, for instance, 'FSK' and so forth except therefor.

SUMMARY OF THE INVENTION

In view of the foregoing, it is an object of the present invention, in order to overcome the above-mentioned problem, to provide a clock synchronizing circuit which enables initial phase synchronization of the clock to be realized even though in the case of modulation system except for quadrature modulation in such a way that it uses cosine/sine output circuit for finding cosine component and sine component of initial phase of the symbol clock with simple constitution.

According to a first aspect of the present invention, in order to achieve the above-mentioned object, there is provided a clock synchronizing circuit which comprises a sampler inputting thereto an input signal and a sampling clock, before outputting sampling signal by sampling the input signal with the condition of 'N' times of symbol rate, a sequencer for inputting thereto a symbol clock, a sequence start signal, and the sampling clock, before outputting a sign switching signal, a cosine component integration signal, a sine component integration signal, and an initial phase establishment signal, a cosine/sine output circuit inputting thereto an integration clock, the sampling signal, the sign switching signal, the cosine component integration signal, and the sine component integration, before outputting a cosine signal corresponding to cosine component of an initial phase of the symbol clock and a sine signal corresponding to a sine component of the initial phase of the symbol clock, an angle detector inputting thereto the cosine signal and the sine signal, before obtaining initial phase of the symbol clock, thus outputting it as an initial phase signal, a sampling clock generation circuit inputting thereto the initial phase signal and the initial phase establishment signal, before outputting both of the sampling clock which has fixed phase before initial phase establishment, and which is subjected to phase control in such a way that the symbol clock is synchronized with the input signal at the time of initial phase establishment, and the integration clock, and a frequency divider for dividing the sampling clock into symbol clock with 1/N times frequency in order to input it to the sequencer.

According to a second aspect of the present invention, there is provided a clock synchronizing circuit which comprises a sampler inputting thereto an input signal and a sampling clock, before outputting sampling signal by sampling the input signal with the condition of 'N' times of symbol rate, a sequencer for inputting thereto a symbol clock, a sequence start signal, and the sampling clock, before outputting a sign switching signal, a cosine/sine selection signal, and an initial phase establishment signal, a cosine/sine output circuit inputting thereto an integration clock, the sampling signal, the sign switching signal, and the cosine/sine selection signal, before outputting a cosine signal corresponding to cosine component of an initial phase of the symbol clock and a sine signal corresponding to a sine component of the initial phase of the symbol clock, an angle detector inputting thereto the cosine signal and the sine signal, before obtaining initial phase of the symbol clock, thus outputting it as an initial phase signal, a sampling clock generation circuit inputting thereto the initial phase signal and the initial phase establishment signal, before outputting both of the sampling clock which has fixed phase before initial phase establishment, and which is subjected to phase control in such a way that the symbol clock is synchronized with the input signal at the time of initial phase establishment, and the integration clock, and a frequency divider for dividing the sampling clock into symbol clock with 1/N times frequency in order to input it to the sequencer.

According to a third aspect of the present invention, in the first aspect, there is provided a clock synchronizing circuit, wherein the cosine/sine output circuit comprises a sign switching circuit inputting thereto the sampling signal and the sign switching signal, before outputting either the sampling signal or a signal obtained by inverting the sampling signal as switching sampling signal in answer to the sign switching signal, a first integrator inputting thereto the switching sampling signal, the cosine component integration signal, and the integration clock, before outputting signal obtained by integrating the switching sample signal as an integration cosine signal only during period which becomes effective due to the cosine component integration signal, a second integrator inputting thereto the switching sampling signal, the sine component integration signal, and the integration clock, before outputting signal obtained by integrating the switching sampling signal as an integration sine signal only during period which becomes effective due to the sine component integration signal, a first averaging circuit inputting thereto the integration cosine signal, before outputting the cosine signal which is obtained while averaging according to the number of times of integration, and a second averaging circuit inputting thereto the integration sine signal, before outputting the sine signal which is obtained while averaging according to the number of times of integration.

According to a fourth aspect of the present invention, in the second aspect, there is provided a clock synchronizing circuit, wherein the cosine/sine output circuit comprises a sign switching circuit inputting thereto the sampling signal and the sign switching signal, before outputting either the sampling signal or a signal obtained by inverting the sampling signal as switching sampling signal in answer to the sign switching signal, a cosine/sine selection circuit inputting thereto the switching sampling signal, and the cosine/sine selection signal, before outputting the switching sampling signal as a cosine component signal when being selected as a cosine component, while outputting the switching sampling signal as a sine component signal when being selected as a sine component, a first integrator inputting thereto the cosine component signal and the integration clock, before outputting an integration cosine signal obtained by integrating the cosine component signal, a second integrator inputting thereto the sine component signal, and the integration clock, before outputting an integration sine signal obtained by integrating the sine component signal, a first averaging circuit inputting thereto the integration cosine signal, before outputting the cosine signal which is obtained after averaging according to the number of times of integration, and a second averaging circuit inputting thereto the integration sine signal, before outputting the sine signal which is obtained after averaging according to number of integration.

According to a fifth aspect of the present invention, there is provided a clock synchronizing circuit, wherein the input signal has an interval in which change that the input signal changes from the maximum value to the minimum value within half cycle of the symbol clock and further returning to the maximum value within the latter half cycle is repeated periodically, clock with speed of ½ times of the symbol clock is employed for the sign switching signal, the symbol clock is employed for the cosine component integration signal, signal obtained by inverting the cosine component integration signal is employed for the sine component integration signal, and clock with speed of 2 times of the symbol clock is employed for the integration clock.

According to a sixth aspect of the present invention, there is provided a clock synchronizing circuit, wherein the input signal has an interval in which change that the input signal changes from the maximum value to the minimum value within half cycle of the symbol clock and further returning to the maximum value within the latter half cycle is repeated periodically, clock with speed of ½ times of the symbol clock is employed for the sign switching signal, the symbol clock is employed for the cosine/sine selection signal, and clock with speed of 2 times of the symbol clock is employed for the integration clock.

As described above, according to the aspects of the present invention, the cosine/sine output circuit inputs thereto the integration clock, the sampling signal, the sign switching signal, the cosine component integration signal, and the sine component integration signal, before obtaining cosine signal corresponding to cosine component of initial phase of the symbol clock and sine signal corresponding to sine component of the initial phase of the symbol clock. The angle detector inputs thereto the cosine signal and the sine signal, before obtaining the initial phase of the symbol clock. It is capable of realizing surely initial phase synchronization of the clock even though the modulation system is the modulation system except for quadrature modulation.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

Figure 2:
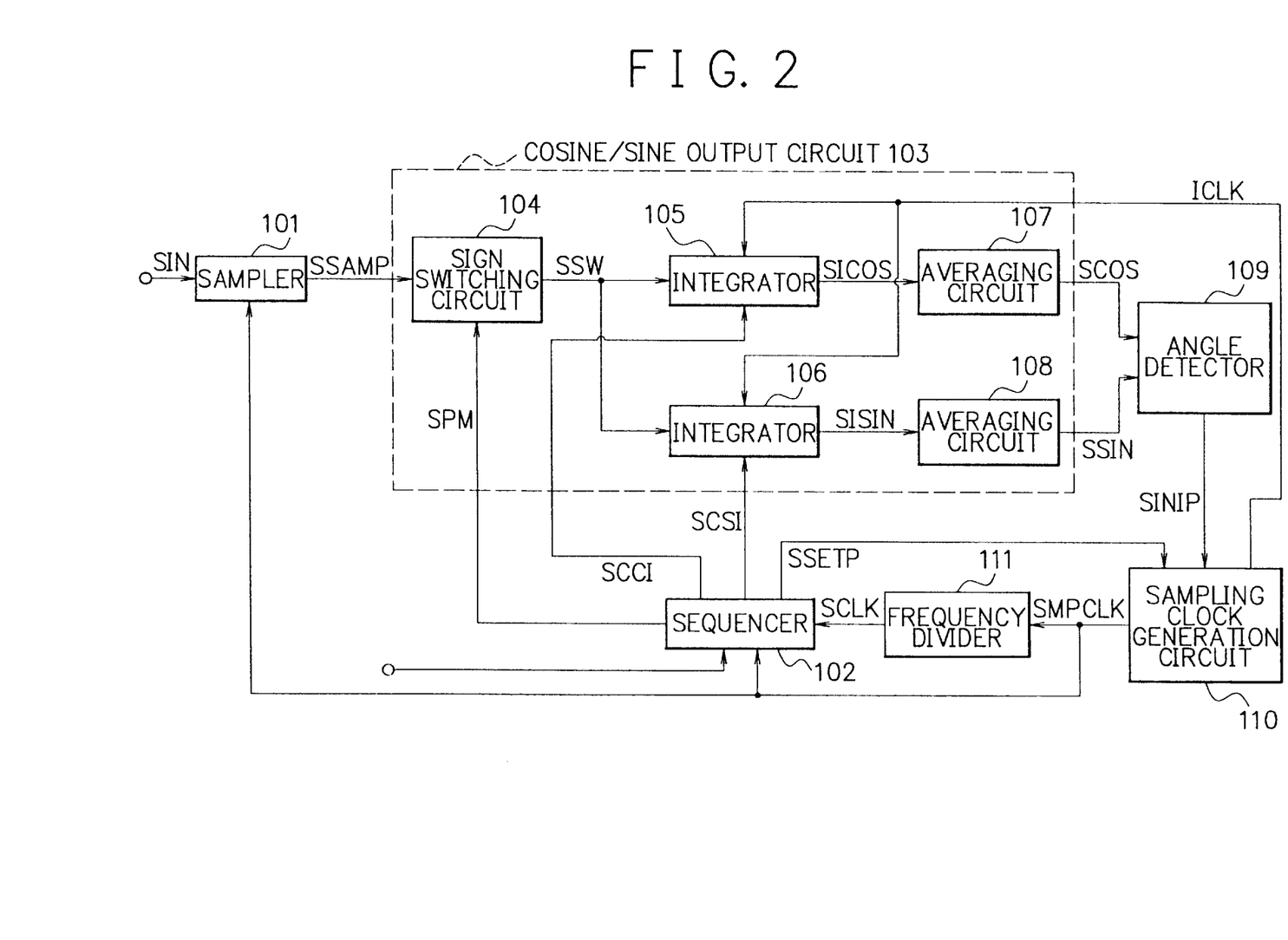
FIG. 2 is a circuit view showing a clock synchronizing circuit according to one embodiment of the present invention.

A preferred embodiment of the present invention will now be described in detail in accordance with the accompanying drawings. FIG. 2 is a block diagram showing a clock synchronizing circuit of the present invention. In FIG. 2, a sampler 101 inputs thereto an input signal 'SIN' and a sampling clock 'SMPCLK'. The sampler 101 implements sampling of the input signal 'SIN' with 'N' times of symbol rate, here, 2 times of the symbol rate, before outputting as a sampling signal 'SSAMP'. Further, a sequencer 102 inputs thereto a symbol clock 'SCLK', a sequence start signal 'SST' and a sampling clock 'SMPCLK'. The sequencer 102 functions so as to output a sign switching signal 'SPM' corresponding to a clock with speed of ½ times of the symbol clock 'SCLK', a cosine component integration signal 'SCCI' identical with the symbol clock 'SCLK', a sine component integration signal 'SCSI' to be an inverted symbol clock 'SCLK' and an initial phase establishment signal 'SSETP'.

Further, a sign switching circuit 104 constitutes a part of cosine/sine output circuit 103.The sign switching circuit 104 inputs therein a sampling signal 'SSAMP' and a sign switching signal 'SPM'. The sign switching circuit 104 functions so as to output sampling signal 'SSAMP' itself or signal which is obtained while inverting sampling signal 'SSAMP' as a switching sampling signal 'SSW' in answer to the sign switching signal 'SPM'. An integrator 105 is a first integrator. The integrator 105 inputs thereto the switching sampling signal 'SSW', a cosine component integration signal 'SCCI', and an integration clock 'ICLK' corresponding to a clock with a speed of 2 times symbol clock 'SCLK'. Subsequently, the integrator 105 outputs signal obtained by integrating the switching sample signal 'SSW' as an integration cosine signal 'SICOS' only during period which becomes effective due to the cosine component integration signal 'SCCI'. An integrator 106 is a second integrator. The integrator 106 inputs thereto the switching sampling signal 'SSW', the sine component integration signal 'SCSI', and the integration clock 'ICLK'. The integrator 106 functions so as to output signal obtained by integrating the switching sampling signal 'SSW' as an integration sine signal 'SISIN' only during period which becomes effective due to the sine component integration signal 'SCSI'.

On the other hand, an averaging circuit 107 is a first averaging circuit. The averaging circuit 107 inputs thereto the integration cosine signal 'SICOS'. The averaging circuit 107 outputs the cosine signal 'SCOS' which is obtained while averaging the number of integration. An averaging circuit 108 is a second averaging circuit. The averaging circuit 108 inputs thereto the integration sine signal 'SISIN'. The averaging circuit 108 outputs the sine signal 'SSIN' which is obtained while averaging according to the number of integration. Further, an angle detector 109 inputs thereto the cosine signal 'SCOS' and the sine signal 'SSIN' before obtaining initial phase of the symbol clock 'SCLK'. Subsequently, the angle detector 109 functions so as to output the initial phase of the symbol clock 'SCLK' as an initial phase signal 'SINIP'. A sampling clock generation circuit 110 inputs thereto the initial phase signal 'SINIP' and an initial phase establishment signal 'SSETP'. The sampling clock generation circuit 110 functions to output a sampling clock 'SMPCLK' which has fixed phase before initial phase establishment, and which is subjected to phase control in such a way that the symbol clock 'SCLK' is synchronized with the input signal 'SIN' at the time of initial phase establishment, and the integration clock 'ICLK'. A frequency divider 111 divides the sampling clock 'SMPCLK' into clock with 1/N times frequency thereof to output it as the symbol clock 'SCLK'.

Figure 3:
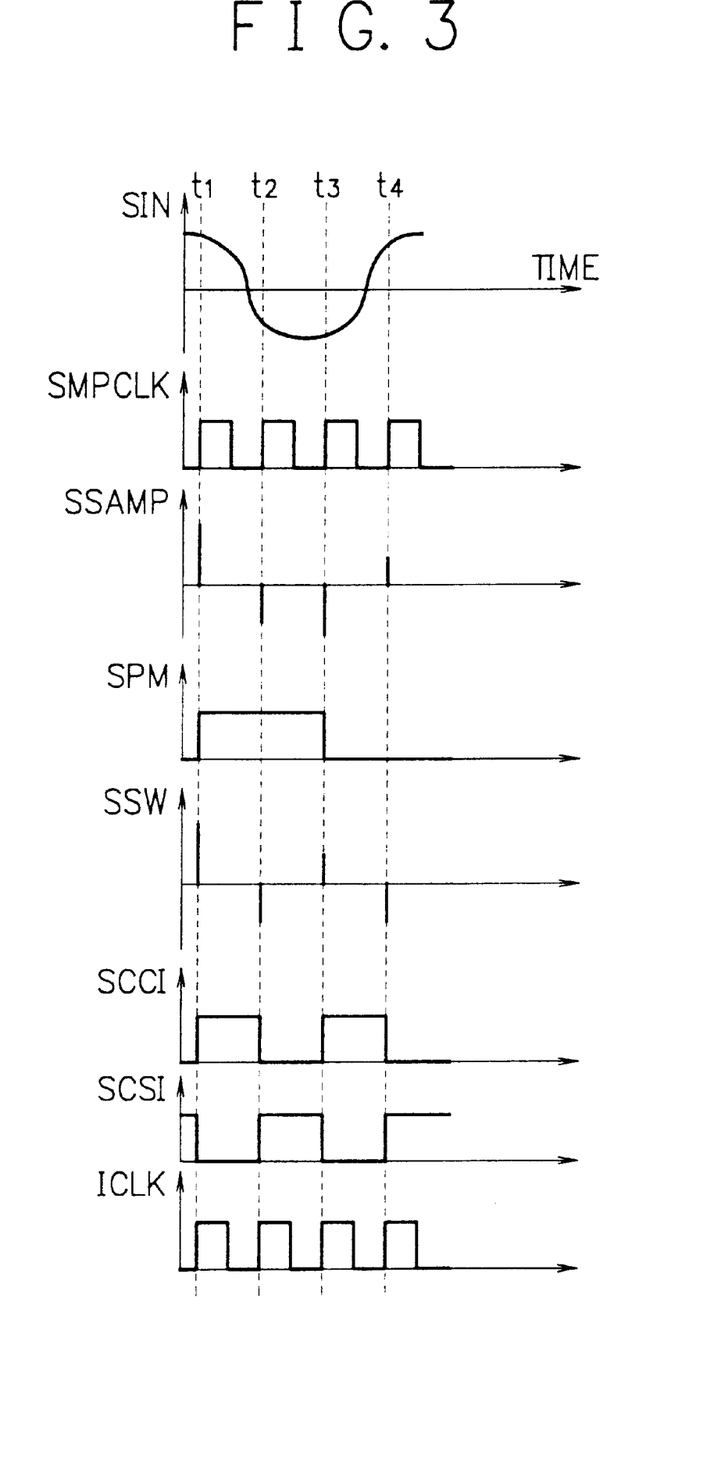
FIG. 3 is a timing chart showing signal of respective parts of block shown in FIG. 2.

Next, there will be described operation of the clock synchronization circuit while referring to timing chart of FIG. 3. Firstly, the input signal 'SIN', as a preamble, has an interval in which change that the input signal 'SIN' changes from the maximum value to the minimum value within half cycle of the symbol clock and further returning to the maximum value within the latter half cycle is repeated periodically. The sampling signal 'SSAMP' is obtained in such a way that the input signal 'SIN' is sampled at leading edge of the sampling clock 'SMPCLK'. When the phase of the symbol clock 'SCLK' is advanced by θ, the sampling signal 'SSAMP' becomes 'cos θ', at the time t1, the sampling signal 'SSAMP' becomes 'sin θ', at the time t2, the sampling signal 'SSAMP' becomes '−cos θ', at the time t3, and the sampling signal 'SSAMP' becomes '−sin θ', at the time t4. The switching sampling signal 'SSW', when the sign switching signal 'SPM' is 'High', is the same as the sampling signal 'SSAMP', while when the sign switching signal 'SPM' is 'Low', the switching sampling signal 'SSW' becomes the sampling signal 'SSAMP' with code inversion. Consequently, it becomes cos θ at the time of t1, t3, and sin θ at the time of t2, t4.

Accordingly, when only the cosine integration signal 'SCCI' is 'High', the switching sampling signal 'SSW' is integrated at leading edge of the integration clock 'ICLK'. As a result, only the cosine component COS θ is integrated. Thus, it is capable of being obtained the cosine signal cos θ by averaging COS θ. Further, when only the sine integration signal 'SCSI' is 'High', the switching sampling signal 'SSW' is integrated at leading edge of the integration clock 'ICLK'. As a result, only the sine component SIN θ is integrated. It is capable of being obtained the sine signal sin θ by averaging SIN θ. The more number of integration increase, the less error according to noise is diminished. An initial phase θ of the symbol clock 'SCLK' is obtained by obtaining "tan−1" (SCOS/SSIN) in the angular detector 109.

Figure 4:
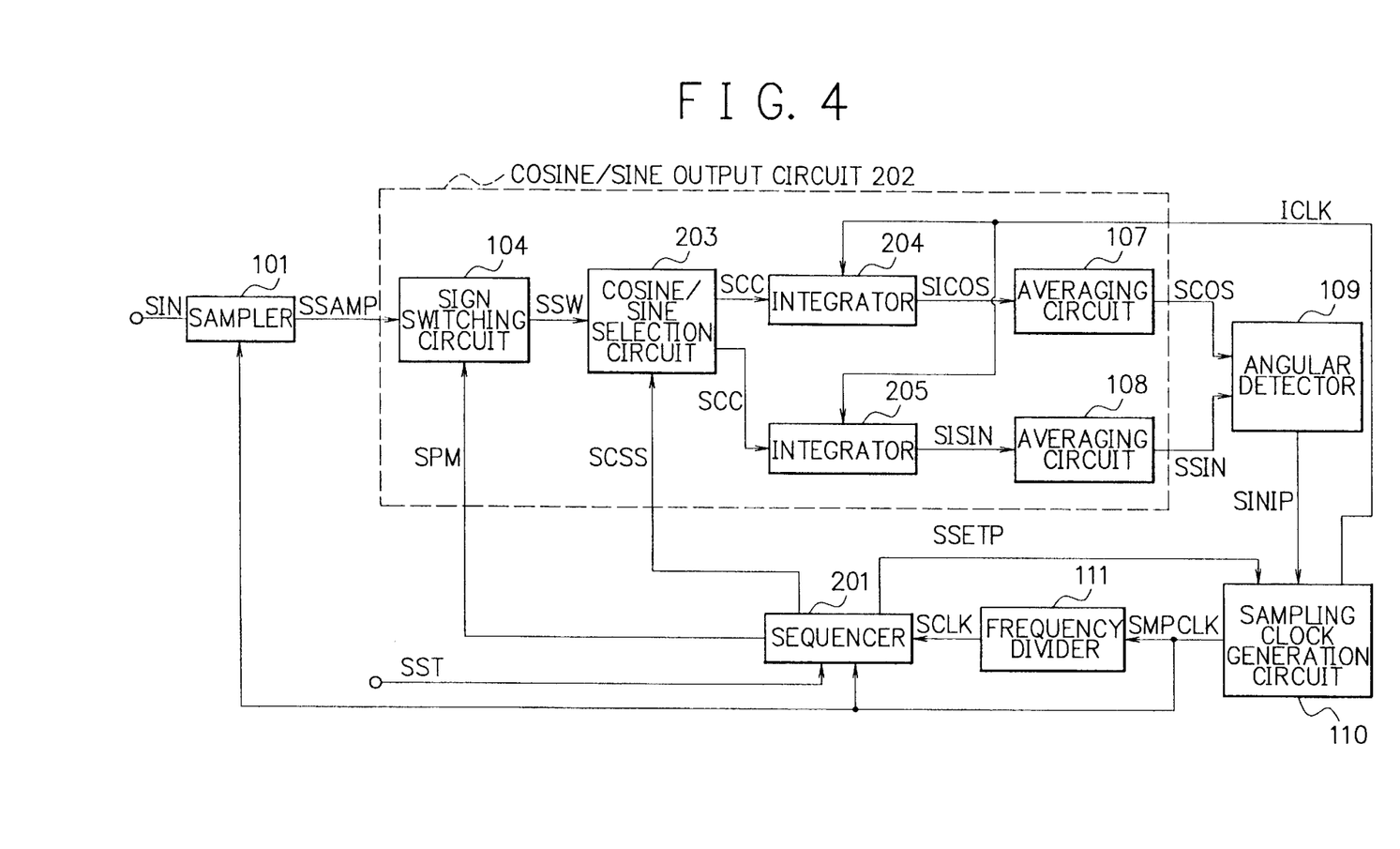
FIG. 4 is a circuit view showing a clock synchronizing circuit according to another embodiment of the present invention.

FIG. 4 is a block diagram showing another embodiment of the present invention. In FIG. 4, a sampler 101 inputs thereto an input signal 'SIN' and a sampling clock 'SMPCLK'. The sampler 101 implements sampling of the input signal 'SIN' with the condition of 2 times of the symbol rate, before outputting as a sampling signal 'SSAMP'. A sequencer 201 inputs thereto a symbol clock 'SCLK', a sequence start signal 'SST' and a sampling clock 'SMPCLK'. The sequencer 102 functions so as to output a sign switching signal 'SPM' corresponding to a clock with speed of ½ times of the symbol clock 'SCLK', a cosine/sine selection signal 'SCSS' identical with the symbol clock 'SCLK', and an initial phase establishment signal 'SSETP'.

Further, a sign switching circuit 104 inputs thereto a sampling signal 'SSAMP' and a sign switching signal 'SPM'. The sign switching circuit 104 functions so as to output sampling signal 'SSAMP' itself or signal which is obtained while inverting sampling signal 'SSAMP' as a switching sampling signal 'SSW' in answer to the sign switching signal 'SPM'. A cosine/sine selection circuit 203 inputs thereto the switching sampling signal 'SSW', and a cosine/sine selection signal 'SCSS'. The cosine/sine selection circuit 203 functions so as to output the switching sampling signal as a cosine component signal 'SCC' when the input is selected as cosine component, while when the input is selected as sine component, outputting the switching sampling signal as sine component signal 'SSC'. An integrator 204 is a first integrator. The first integrator 204 inputs thereto the cosine component signal 'SC', and an integration clock 'ICLK' corresponding to a clock with speed of 2 times symbol clock 'SCLK'. The integrator 204 outputs signal obtained by integrating the switching sample signal 'SSW' as an integration cosine signal 'SICOS'. An integrator 205 is a second integrator. The second integrator 205 inputs thereto the sine component signal 'SSC', and the integration clock 'ICLK'. The integrator 205 functions to output signal obtained by integrating the switching sampling signal 'SSW' as an integration sine signal 'SISIN'.

Further, an averaging circuit 107 is a first averaging circuit. The averaging circuit 107 inputs thereto the integration cosine signal 'SICOS'. The averaging circuit 107 outputs the cosine signal 'SCOS' which is obtained while averaging according to the number of times of integration. An averaging circuit 108 is a second averaging circuit. The averaging circuit 108 inputs thereto the integration sine signal 'SISIN'. The averaging circuit 108 outputs the sine signal 'SSIN' which is obtained while averaging according to the number of times of integration. An angle detector 109 inputs thereto the cosine signal 'SCOS' and the sine signal 'SSIN' before obtaining initial phase of the symbol clock 'SCLK'. The angle detector 109 functions so as to output the initial phase of the symbol clock 'SCLK' as an initial phase signal 'SINIP'. A sampling clock generation circuit 110 inputs thereto the initial phase signal 'SINIP' and an initial phase establishment signal 'SSETP'. The sampling clock generation circuit 110 functions to output a sampling clock 'SMPCLK' which has fixed phase before initial phase establishment, and which is subjected to phase control in such a way that the symbol clock 'SCLK' is synchronized with the input signal 'SIN' at the time of initial phase establishment, and the integration clock 'ICLK'. A frequency divider 111 divides the sampling clock 'SMPCLK' into clock with 1/N times frequency to output it as the symbol clock 'SCLK'.

Figure 5:
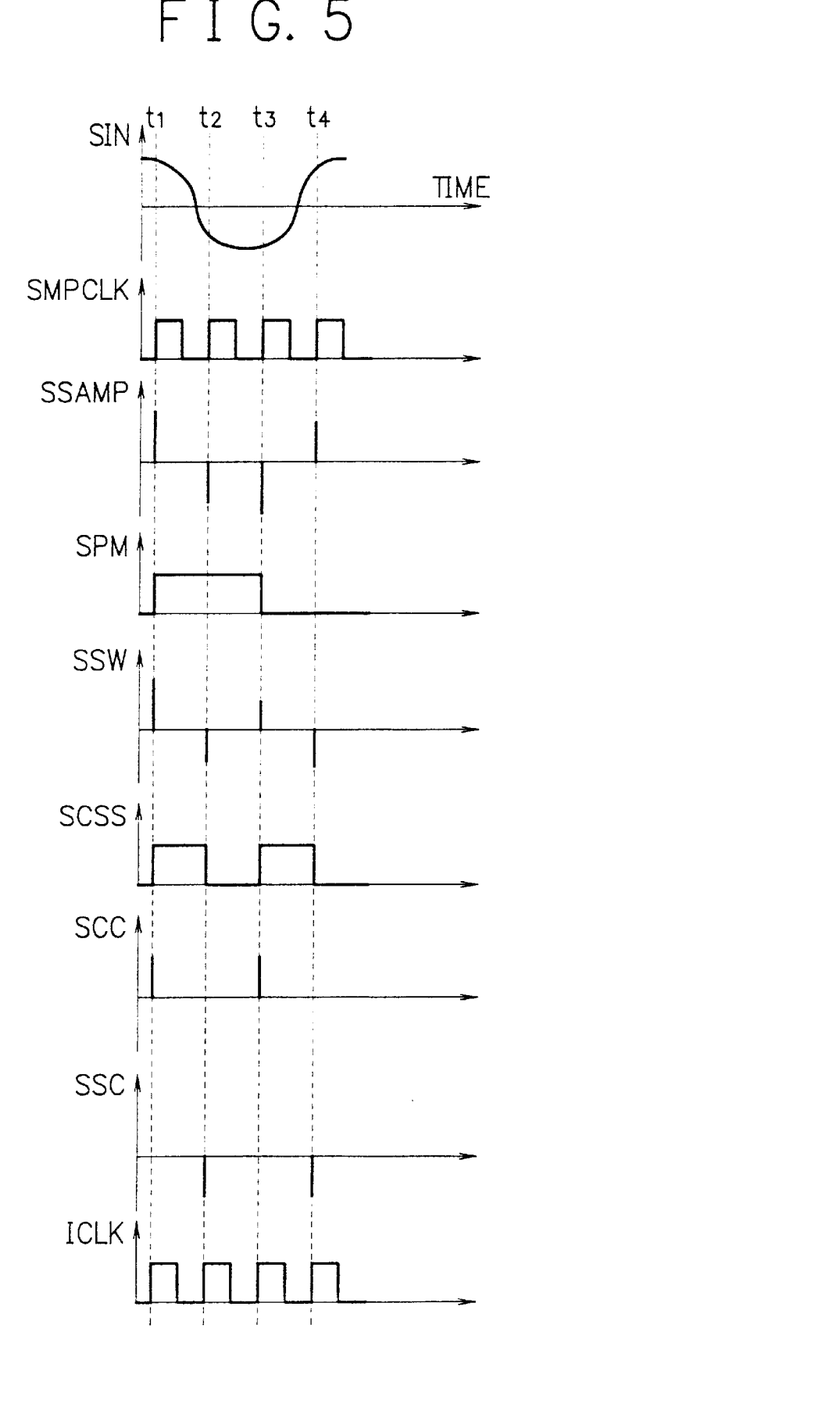
FIG. 5 is a timing chart showing signal of respective parts of block shown in FIG. 4.

Next, there will be described operation of the another embodiment of the clock synchronizing circuit while referring to timing chart of FIG. 5. Firstly, the input signal 'SIN', as a preamble, has an interval in which change that the input signal 'SIN' changes from the maximum value to the minimum value within half cycle of the symbol clock and further returning to the maximum value within the latter half cycle is repeated periodically. The sampling signal 'SSAMP' is obtained in such a way that the input signal 'SIN' is sampled at leading edge of the sampling clock 'SMPCLK'. When the phase of the symbol clock 'SCLK' is advanced by θ, the sampling signal 'SSAMP' becomes 'cos θ', at the time t1, the sampling signal 'SSAMP' becomes 'sin θ', at the time t2, the sampling signal 'SSAMP' becomes '−cos θ', at the time t3, and the sampling signal 'SSAMP' becomes '−sin θ', at the time t4. The switching sampling signal 'SSW', when the sign switching signal 'SPM' is 'High', is the same as the sampling signal 'SSAMP', while when the sign switching signal 'SPM' is 'Low', the switching sampling signal 'SSW' becomes the sampling signal 'SSAMP' with code inversion. Consequently, it becomes cos θ at the time of t1, t3, and sin θ at the time of t2, t4.

The cosine component signal 'SCC' is outputted when the cosine/sine selection signal 'SCSS' is only 'High', thus the cosine component signal 'SCSS' takes the same value as the switching sampling signal 'SSW'. The sine component signal 'SSC' is outputted when the cosine/sine selection signal 'SCSS' is only 'Low', thus the sine component signal 'SSC' takes the same value as the switching sampling signal 'SSW'. Consequently, the cosine component signal 'SCC' is integrated at leading edge of the integration clock 'ICLK'. As a result, only the cosine component COS θ is integrated. It is capable of being obtained the cosine signal cos θ by averaging COS θ. Further, when the sine component signal 'SSC' is integrated at leading edge of the integration clock 'ICLK', only the cosine component SIN θ is integrated. It is capable of being obtained the sine signal sin θ by averaging SIN θ. The more the number of times of integration increase, the less error according to noise is diminished. An initial phase θ of the symbol clock 'SCLK' is obtained by obtaining "tan−1" (SCOS/SSIN) in the angular detector 109.

As described above, according to the present invention, the cosine/sine output circuit inputs thereto the integration clock, the sampling signal, the sign switching signal, the cosine component integration signal, and the sine component integration signal, before obtaining cosine signal corresponding to cosine component of initial phase of the symbol clock and sine signal corresponding to sine component of the initial phase of the symbol clock. The angle detector inputs thereto the cosine signal and the sine signal, before obtaining the initial phase of the symbol clock. There is obtained the effect that it is capable of realizing surely initial phase synchronization of the clock even though the modulation system is the modulation system except for quadrature modulation.

While preferred embodiments of the invention have been described using specific terms, such description is for illustrative purpose only, and it is to be understood that changes and variations may be made without departing from the spirit or scope of the following claims.

What is claimed is:

1. A clock synchronizing circuit comprising:
   a sampler inputting thereto an input signal and a sampling clock, before outputting sampling signal by sampling said input signal with the condition of 'N' times of symbol rate;
   a sequencer inputting thereto a symbol clock, a sequence start signal, and said sampling clock, before outputting a sign switching signal, a cosine component integration signal, a sine component integration signal, and an initial phase establishment signal;
   a cosine/sine output circuit inputting therein an integration clock, said sampling signal, said sign switching signal, said cosine component integration signal, and said sine component integration signal, before outputting a cosine signal corresponding to cosine component of an initial phase of said symbol clock and a sine signal corresponding to a sine component of the initial phase of said symbol clock;
   an angle detector inputting thereto said cosine signal and said sine signal, before obtaining initial phase of said symbol clock, thus outputting it as an initial phase signal;
   a sampling clock generation circuit inputting thereto said initial phase signal and said initial phase establishment signal, before outputting both of said sampling clock which has fixed phase before initial phase establishment, and which is subjected to phase control in such a way that said symbol clock is synchronized with said input signal at the time of initial phase establishment, and said integration clock; and
   a frequency divider for dividing said sampling clock into symbol clock with 1/N times frequency in order to input it to said sequencer.

2. A clock synchronizing circuit as claimed in claim 1, wherein said cosine/sine output circuit comprises:
   a sign switching circuit inputting thereto said sampling signal and said sign switching signal, before outputting either said sampling signal or a signal obtained by inverting said sampling signal as switching sampling signal in response to said sign switching signal;
   a first integrator inputting thereto said switching sampling signal, said cosine component integration signal, and said integration clock, before outputting signal obtained by integrating the switching sample signal as an integration cosine signal only during period enabled by the cosine component integration signal;
   a second integrator inputting thereto said switching sampling signal, said sine component integration signal, and said integration clock, before outputting signal obtained by integrating the switching sampling signal as an integration sine signal only during period enabled by the sine component integration signal;
   a first averaging circuit inputting thereto said integration cosine signal, before outputting said cosine signal which is obtained while averaging according to the number of times of integration; and
   a second averaging circuit inputting thereto said integration sine signal, before outputting said sine signal which is obtained while averaging according to the number of times of integration.

3. A clock synchronizing circuit as claimed in claim 1, wherein said input signal has an interval in which the input signal changes from the maximum value to the minimum value within half cycle of the symbol clock and further returning to the maximum value within the latter half cycle, is repeated periodically, clock with speed of ½ times of the symbol clock is employed for said sign switching signal, said symbol clock is employed for said cosine component integration signal, signal obtained by inverting said cosine component integration signal is employed for said sine component integration signal, and clock with speed of 2 times of said symbol clock is employed for said integration clock.

4. A clock synchronizing circuit comprising:

a sampler inputting thereto an input signal and a sampling clock, before outputting sampling signal by sampling said input signal with the condition of 'N' times of symbol rate;

a sequencer inputting thereto a symbol clock, a sequence start signal, and said sampling clock, before outputting a sign switching signal, a cosine/sine selection signal, and an initial phase establishment signal;

a cosine/sine output circuit inputting thereto an integration clock, said sampling signal, said sign switching signal, and said cosine/sine selection signal, before outputting a cosine signal corresponding to cosine component of an initial phase of said symbol clock and a sine signal corresponding to a sine component of the initial phase of said symbol clock;

an angle detector inputting thereto said cosine signal and said sine signal, before obtaining initial phase of said symbol clock, thus outputting it as an initial phase signal;

a sampling clock generation circuit inputting thereto said initial phase signal and said initial phase establishment signal, before outputting both of said sampling clock which has fixed phase before initial phase establishment, and which is subjected to phase control in such a way that said symbol clock is synchronized with said input signal at the time of initial phase establishment, and said integration clock; and a frequency divider for dividing said sampling clock into symbol clock with 1/N times frequency in order to input it to said sequencer.

5. A clock synchronizing circuit as claimed in claim 4, wherein said cosine/sine output circuit comprises:

a sign switching circuit inputting thereto said sampling signal and said sign switching signal, before outputting either said sampling signal or a signal obtained by inverting said sampling signal as switching sampling signal in response to said sign switching signal;

a cosine/sine selection circuit inputting thereto said switching sampling signal, and said cosine/sine selection signal, before outputting said switching sampling signal as a cosine component signal when being selected as a cosine component, while outputting said switching sampling signal as a sine component signal when being selected as a sine component;

a first integrator inputting thereto said cosine component signal and said integration clock, before outputting an integration cosine signal obtained by integrating said cosine component signal;

a second integrator inputting thereto said sine component signal, and said integration clock, before outputting an integration sine signal obtained by integrating said sine component signal;

a first averaging circuit inputting thereto said integration cosine signal, before outputting said cosine signal which is obtained while averaging according to the number of times of integration; and a second averaging circuit inputting thereto said integration sine signal, before outputting said sine signal which is obtained while averaging according to the number of times of integration.

6. A clock synchronizing circuit as claimed in claim 2, wherein said input signal has an interval in which the input signal changes from the maximum value to the minimum value within half cycle of the symbol clock and further returning to the maximum value within the latter half cycle, is repeated periodically, clock with speed of ½ times of the symbol clock is employed for said sign switching signal, said symbol clock is employed for said cosine/sine selection signal, and clock with speed of 2 times of said symbol clock is employed for said integration clock.

* * * * *